United States Patent Office 3,830,901
Patented Aug. 20, 1974

3,830,901
CONTINUOUS PROCESS FOR EXTRUDING
CELLULAR THERMOPLASTICS
Thomas W. Winstead, 2 Overlook Lane,
Baltimore, Md. 21220
Continuation of application Ser. No. 758,292, Sept. 9,
1968, which is a continuation-in-part of application
Ser. No. 476,464, Aug. 2, 1965, both now abandoned.
This application June 5, 1970, Ser. No. 43,923
Int. Cl. B29d 27/00
U.S. Cl. 264—51                                        8 Claims

ABSTRACT OF THE DISCLOSURE

A continuous process for extruding cellular thermoplastics, wherein a blowing agent is introduced into a charge of thermoplastic material while the latter is being heated, fluxed and mixed under controlled temperature and pressure conditions in the extrusion barrel of a single screw extrusion machine. After leaving the barrel, the material is separately metered at a point physically and thermally removed from the extrusion machine to regulate pressures and output, and the metered material is then separately cooled and extruded through a die orifice.

REFERENCE TO COPENDING APPLICATIONS

Figure 1:
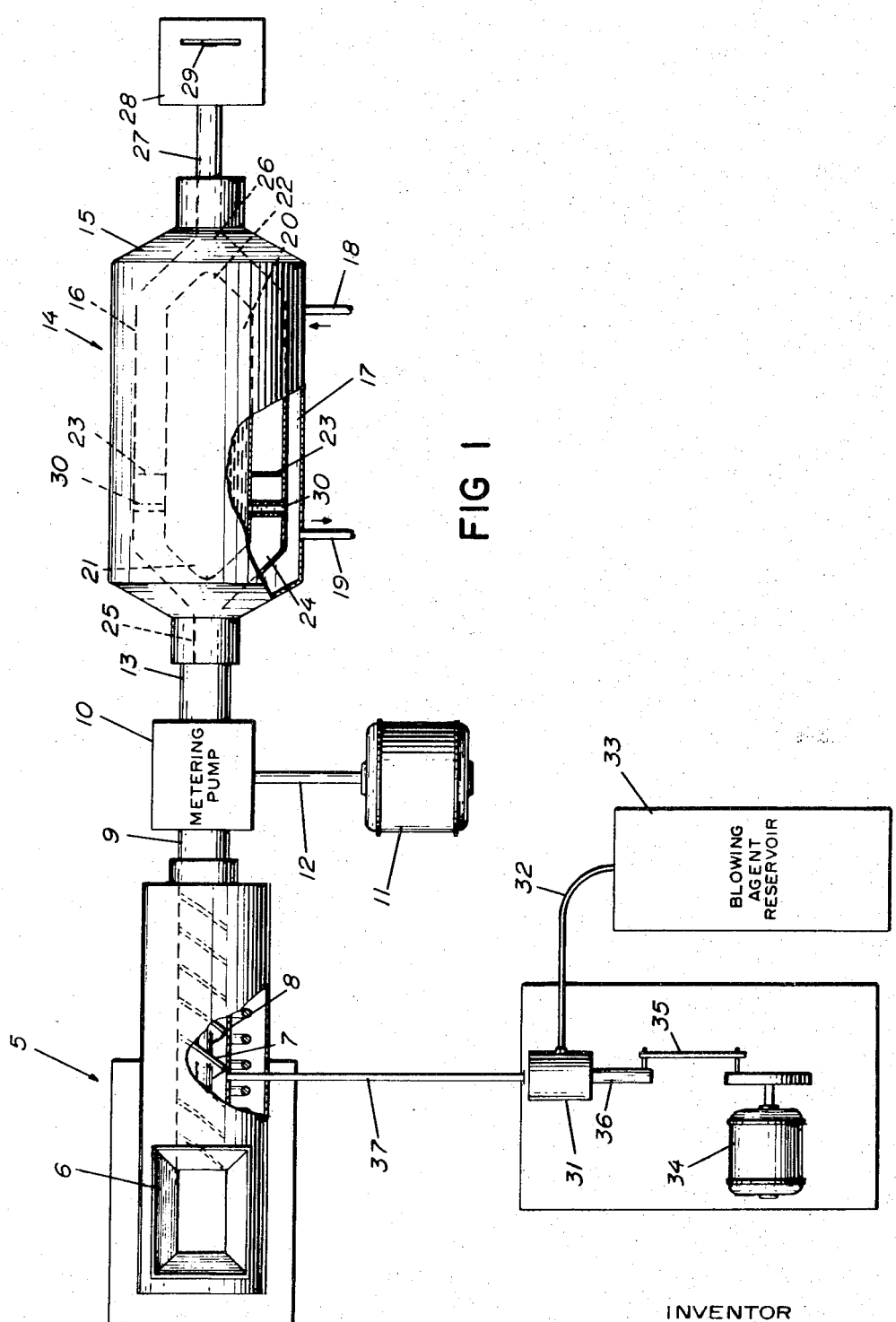

This application is a continuation of my copending Application Ser. No. 758,292, filed Sept. 9, 1968, now abandoned, which is a continuation-in-part of my copending Application Ser. No. 476,464, filed Aug. 2, 1965, now abandoned.

BACKGROUND OF THE INVENTION

There are a number of conventional processes for foaming thermoplastics in extrusion systems, including those for manufacturing thermoplastic compounds containing unexpanded blowing agents, and those involving the extrusion of cellular or foamed thermoplastics while directly injecting chemical blowing agents into the extruder and allowing the expansion to occur as the extrudate emerges from the die.

In these latter systems, where the extrudate expands upon emergence from the die, in order to obtain satisfactory product results, it has been necessary to accurately control temperatures and pressures throughout the system, as otherwise the entire system becomes unstable. It is generally recognized that a single screw extruder does not normally provide a particularly stable system from an operational standpoint in the manufacture of cellular or foamed thermoplastic materials, and in order to obtain satisfactory results, it is necessary to effect a number of steps and controls not normally required in an extrusion operation. Ordinarily, a single screw machine is only required to flux, mix and meter material, but in the processing of cellular materials in a conventional system, the following steps and controls must be accomplished within the length of the screw:

1. The raw material must first be heated to a point where it becomes fused and softened;
2. As the material progresses along the screw, it must be thoroughly fluxed and mixed;
3. If liquid or gaseous blowing agents are employed, these must then be injected against pressures sometimes as high as 5,000 lbs. per square inch;
4. After injection of the blowing agent, the stock must be thoroughly mixed;
5. After mixing, the stock must be cooled to an appropriate degree; and
6. The stock must then be carried to the die under controlled temperature, rate of flow and pressure conditions.

It will be apparent that regardless of the length of the barrel of a single screw machine, the functions above referred to are very difficult to establish on a controlled basis.

SUMMARY OF THE INVENTION

It is the primary object of the present invention to provide an improved continuous process for extruding cellular thermoplastics in a system employing a single screw machine, and, at the same time, avoiding the normally objectionable features in a single screw system by separately controlling the variables in zones which are both physically and thermally separated from the extrusion machine.

Another object of the invention is to provide a process of this nature which affords unusual stability essential in the forming of thermoplastic articles in a continuous system after the extrudate leaves the die.

Another object of the invention is to provide a process for extruding cellular thermoplastics utilizing a relatively small extrusion screw and thereby effecting economy, both in control advantages and in investment costs.

A further object of the invention is to provide a process wherein operating costs are reduced because the total power and heat requirements are minimized due to the overall efficiencies developed.

With the above and other objects in view which will appear as the description proceeds, the invention consists in the novel features herein set forth, illustrated in the accompanying drawings, and more particularly pointed out in the appended claims.

THE DRAWINGS

Figure 2:
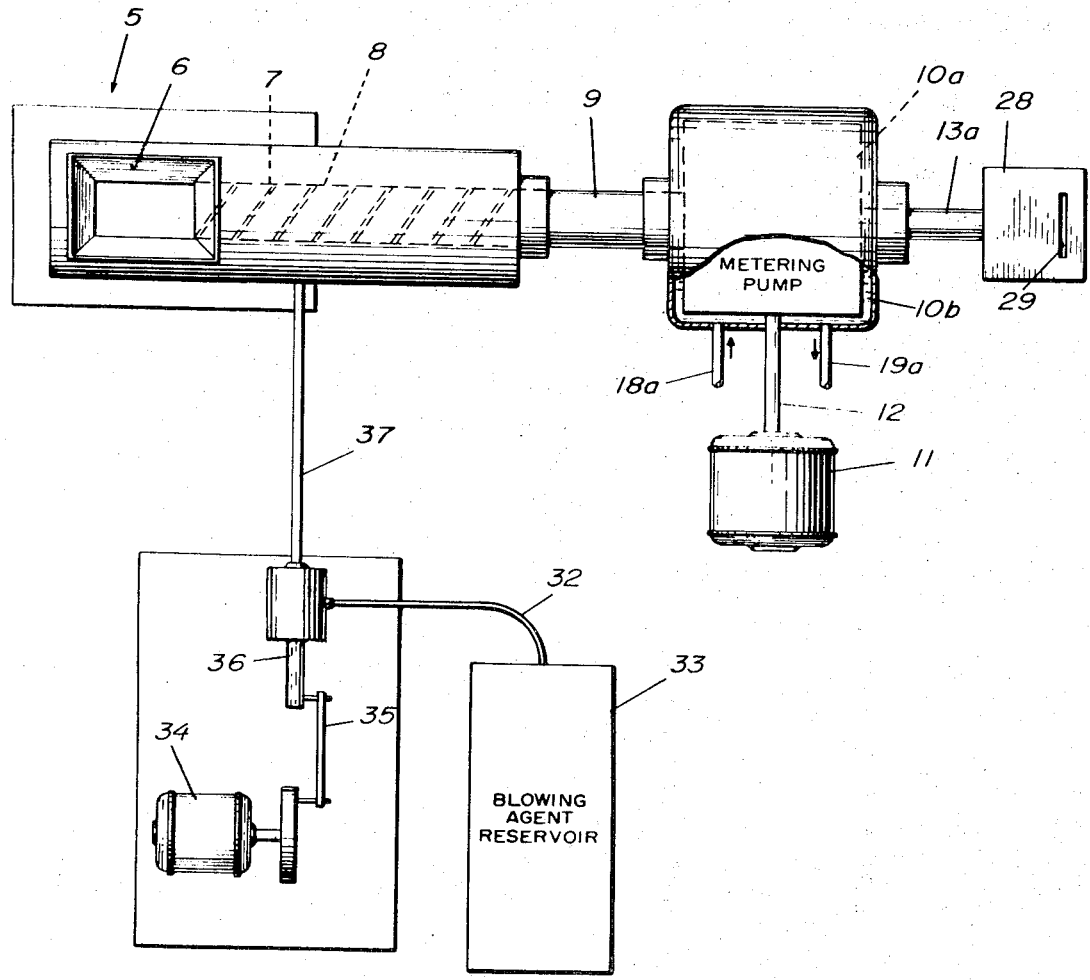

Referring to the drawings in which numerals of like character designate similar parts throughout both views:

FIG. 1 is a schematic plan view illustrating an apparatus suitable for practising the preferred form of the invention; and FIG. 2 is a similar view illustrating a modified form of apparatus.

DETAILED DESCRIPTION

Referring first to FIG. 1 of the drawings, 5 represents a more or less conventional extruding machine having a hopper 6 and a single screw 7 operating in a barrel 8. The barrel 8 discharges through conduit 9 into a metering gear pump 10 which is physically and thermally separated from the barrel 8 and may be of conventional form designed to precisely regulate pressures and output. The gear pump 10 is driven by an electric motor 11 to which it is connected by shaft 12. The gear pump is of the positive displacement type, and its speed may be varied to precisely meter whatever output is desired throughout the system at all times.

A discharge conduit 13 connects the metering pump to a cooling unit, generally designated by the numeral 14. This unit comprises a cylindrical shell 15, and spaced inwardly therefrom is an annular partition 16, defining within the shell an annular cooling jacket 17 having inlet and outlet passageways 18 and 19 respectively for the circulation of a cooling liquid in the jacket. Concentrically disposed within the shell 15 is a longitudinally disposed core 20 which is preferably formed with substantially conical ends 21 and 22. The core 20 is supported in inwardly spaced relation to the annular partition 16 by any suitable means, such as spiders 23, and is positioned to define the inner wall of an annular plastic passageway 24 which converges at one end as at 25 where it communicates with the conduit 13 leading from the metering pump and at its other end as at 26 where it discharges into a conduit 27 leading to the extrusion die 28 having extrusion orifice 29.

To facilitate the cooling operation of the cooler 14, the core 20 is preferably hollow and is provided with passageways 30 whereby its interior communicates with the main cooler jacket 17.

As previously pointed out, in the manufacture of cellular or foamed thermoplastic stock, suitable blowing agents are directly injected into the barrel of the extruding machine. In order to accomplish this in the present invention, a reciprocating pump 31 is connected by line 32 to a source of blowing agent 33. The pump is driven by an electric motor 34 through a suitable crank arm 35 which reciprocates the plunger rod 36 of the pump, causing the blowing agent to be injected into the barrel 8 through a line 37 connected to the pump.

In operation, a suitable plastic charging stock, such as polystyrene, preferably in granular form, is introduced in the extruding machine through hopper 6. As the material is conducted through the barrel 8 by the screw 7, it is first heated, fluxed and mixed in the usual manner. The blowing agent, which may be in the form of pentane or other suitable material which is somewhat soluble in certain thermoplastics, is injected into the barrel 8 through line 37 by the reciprocating pump 31. Preferably, the point of injection of the blowing agent is in the middle third of the barrel 8. Thus, the first third of the screw and barrel perform the initial fluxing, heating and mixing, and the final third of the screw and barrel afford sufficient travel to thoroughly mix the material after injection of the blowing agent and assure optimum quality of the finished extrudate.

The mixed material, still under pressure, flows through conduit 9 into the inlet end of metering pump 10, which not only contributes to maintenance of suitable pressures at all times within the extruder, but also precisely meters the material at a constant rate with respect to time, which is so essential if the extrudate is a strip or sheet and is to be formed into finished products of high quality immediately after emerging from the die. Unlike the normal approach of foam extrusion in single screw machines, this metering being physically and thermally separated from the extruder is constant, regardless of temperature or pressure variations within the latter, and thereby an otherwise unstable system is brought into precise control.

The metering pump 10 then feeds the material through conduit 13 into the cooler 14 in which the stock is cooled down to the proper temperature for final emission from the die. The material passes through the annular passageway 24 where it is cooled to the appropriate temperature by the cooling jacket 17 and the cooling fluid on the interior of the core 20. It then leaves the cooling unit through conduit 27 and enters the die head 28 from which it is extruded through the die orifice 29.

One of the basic advantages of the present system is the fact that almost any thermoplastic and a wide variety of blowing agents (liquid or gaseous) can be used successfully because the sequence of steps and independent control of each critical variable permits the use of infinite combinations of the various steps to accommodate the needs or any particular thermoplastic resin or blowing agent. For example, the system has been very successful with polystyrene foam utilizing "high heat" polystyrene resin and a fluorocarbon blowing agent. It has also been equally successful with a wide variety of fluorocarbon compounds with blowing points ranging from as high as +23.8° C. to as low as —29.8° C. I have also used pentane, as previously indicated, with polystyrene.

By contrast, I have also, utilizing the same process but controlling the variables differently, quite successfully produced polyethylene foams. By comparison, these two resins are quite different and process differently, even in the simplest processing systems. Polystyrene has a very gradual softening point and must generally be extruded at a stock temperature level of between 400°–425° F. On the other hand, polyethylene has a very sharp melting point at approximately 212° F. When utilized for foam, it is very important and critical that the stock temperature emerging from the die should be only one or two degrees above its melting point of 212°F. If it is below 212° F., it becomes a solid, and if it is very much above 212° F., the cells coalesce or collapse. In order to properly flux the polyethylene and then mix it with a blowing agent, it must be heated to a temperature of at least 350° F. and desirably held under pressures of 3,000–4,000 p.s.i. It is then conveyed under pressure to the separately controlled positive displacement metering pump, the speed of which is regulated to provide the exact output desired of the system.

Pressure is maintained by increasing the speed of the single screw extruder independently of the metering pump. The mixture is then conveyed through the separately controlled static heat exchanger where the temperature is lowered to precisely the optimum level of 212°–215° F. The material is then conveyed to a die under pressure and through the die orifice, after which it is allowed to expand and by so doing cool below the melting point and thereby solidify without cell collapse. By comparison, polystyrene is fluxed at a temperture of perhaps 425° F. while at a pressure of 5,000 p.s.i. As it progresses through steps of this process, its temperature is lowered to perhaps 300° F. in the cooler. It is then conveyed to the die, after which it expands into a fine celled foam. Unlike polyethylene, it does not pass through a precise freezing point as it expands, but the temperature must be regulated to provide optimum results. If the temperature is increased to as high as 310° F.–315° F., cell collapse will occur. If the temperature is lowered below perhaps 275° F., the extrudate would no longer be handled easily because of the inherently rigid characteristics of polystyrene foam when cool. In my particular fabrication system, it is essential that the polystyrene foam be at a temperature which is readily formed, because the extruded strip is continuously thermoformed as it emerges from the die.

As previously indicated, various thermoplastic materials can be successfully processed according to the method of the present invention, which cannot be successfully processed for the desired purpose in conventional systems, nor in combinations of known systems. For example, polyvinylchloride is a very heat-sensitive thermoplastic, and although it is similar to polystyrene in its gradual temperature softening characteristics, it is far more subject to decomposition if over-heated. In the system of the present invention, polyvinylchloride can be processed into foam by maintaining relatively low pressures in the order of 2,000 lbs. p.s.i. in the single screw extruder. Mixing is dangerous with polyvinylchloride and must be controlled carefully to avoid high shear rates which will over-heat and decompose the resin. By lowering the speed of the screw 7 in the single screw extruder, the shear rates are reduced along with the pressure. When the fluxed material mixed with the blowing agent reaches the metering pump 10, pressure can be raised sufficiently to carry the material through the static cooler 14 and the die 28. In this case, pressures in the static cooler may reach as high as 10,000 p.s.i., but since mixing is not combined with cooling, temperature rise as the material passes through the cooler is minimized.

In the case where a gaseous blowing agent is used, such as air for example, it is very important that extremely high pressures be maintained throughout the system beyond the point where the blowing agent is introduced. Otherwise, coalescence of cells will occur and material quality will be significantly affected. In this case, the die orifice may be designed for higher restriction. Pressures upstream of the die are then maintained at a high level by the metering pump. Pressure between the metering pump and the point at which the blowing agent is introduced are maintained at a high level by high screw speed. In spite of these imposed pressure levels, the output rates continue at a precise level, because the metering pump speed is controlled separately as is the stock temperature at various points in the system.

A typical profile for polystyrene utilizing a fluorocarbon blowing agent would be as follows:

Extrusion Output Rate: 165 lb./hr.
Extruder Screw Speed: 68 r.p.m.
Gear Pump Speed: 66 r.p.m.
Stock Temperature at Blowing Agent Injection Point: 425° F.
Stock Temperature at Extruder Output: 370° F.
Stock Temperature at Gear Pump: 370° F.
Stock Temperature at Cooler Outlet: 295° F.
Stock Temperature at Cooler Inlet: 370° F.
Stock Temperature at Die: 295° F.
Pressure at Blowing Agent Injection Point: 3500 p.s.i.
Pressure at Extruder Output: 6500 p.s.i.
Pressure at Cooler Inlet: 5500 p.s.i.
Pressure at Cooler Outlet: 2200 p.s.i.

For purposes of illustration, a general example of the operating process might be as follows:

Raw material is fed into the hopper 6 at ambient temperatures, such for example as 70° F. and is heated, fluxed and mixed within the barrel 8 where it reaches a temperature of approximately 400° F. This initial heating and mixing can usually be accomplished within the first third of the screw length, as before stated. A blowing agent in gaseous or liquid form is then injected through line 37 into barrel 8 where pressures have risen to possibly 5,000 lbs. p.s.i. Under these pressures, a liquid blowing agent is maintained in its liquid phase, and a gaseous blowing agent is naturally compressed to a very low volume. During passage through the last third of the barrel 8, the material is thoroughly mixed by the screw 7 so as to achieve good dispersion between the blowing agent, the resin, and any other ingredients which may be added for such purposes as coloring, nucleating, etc.

The metering pump 10 may be kept at the same temperature as the stock emerging from the extruding machine 5 which, in the present example, is approximately 400° F., and since the speed of the metering pump may be varied, as well as the speed of the extruder screw, any pressures or pressure profiles desired may be established. By increasing the speed of the metering pump in relation to the screw speed, pressures are reduced within the extruder, and the reverse occurs as the metering pump is operated at a slower speed. As previously stated, this precise control of pressure and output rate stabilizes the extrusion system, even with relatively short single stage extruders. For example, in the extrusion of foamed or cellular materials, it permits the use of a much smaller extruder, run at a very high speed, than would otherwise be possible with an extrusion system not employing such a metering pump. Thus, it serves a unique function in the extrusion of cellular materials which cannot be obtained on any other basis.

From the metering pump, the stock enters the cooler 14 which should be designed to accommodate the maximum output of the system and provide sufficient heat transfer to bring the stock to the final desired extrudate temperature. In the example being discussed, if the stock enters the cooler at 400° F., it may then be materially cooled in cooler 14 to approximately 300° F. before entering the die 28. Thus, the final stock temperature may be independently controlled outside of the extruder and without the heat transfer problems that are normally encountered if this cooling step were conducted within the length of the extrusion screw. The material is then fed into the die 28 and through orifice 29 where it expands, in the form of apparatus shown in the drawing, into a strip or sheet of desired density. Since both density and quality of the extrudate are critically dependent upon stock temperature control within a very few degrees, such control is essential.

This density may be independently controlled by increasing or decreasing the amount of blowing agent injected into the system through line 37. A feature of this system is that such a change in density may be effected without materially affecting the overall stability of the system; whereas, in a single screw system which does not employ a separate metering pump and cooling system, the increase or decrease of blowing agent would seriously affect the stability of the overall system.

In addition to providing an operation which has flexibility with respect to the density of the foamed thermoplastic produced, materials of various melt viscosities may be employed which require different temperature or pressure profiles within the extruder. This may also be accomplished without materially affecting the stability of the overall system. Without the metering pump and cooler, the system normally employed in a single screw machine, regardless of the length to diameter ratio of the extruder, is so unstable that a change in any single variable necessarily requires a complete readjustment of all variables in order to maintain suitable temperature and pressure profiles.

In a modified form of the invention, the cooler 14 may be eliminated and the temperature of the stock emerging from the extruder barrel 8 reduced in temperature by employing a modified metering pump. Such a modification is illustrated in FIG. 2 where the metering pump 10a is of an increased size so as to serve not only as a metering device but also as a cooler. The pump walls are provided with cavities 10b through which coolant may be circulated by lines 18a and 19a, as the material travels through the pump. Of course, the pump must be considerably larger than in the previous form in order to provide sufficient cooling area. Thus, the pump 10a is connected by conduit 13a directly to the extruder die 28, and the cooler 14 eliminated entirely.

In either form of the invention, it will be apparent that by separating the various functions earlier described in connection with conventional single screw extruders, particularly the metering and cooling functions, a much smaller single screw machine may be employed for the process of foaming thermoplastic materials. Since no cooling is required within the barrel of the extruder, it may be heated throughout its entire length, and difficult temperature gradients do not have to be established. This makes the pressure control and pressure distribution throughout the length of the barrel far easier to control than is the case when both high and low temperature gradients must be employed at the same time dynamic frictional heat is being developed along the extruder barrel.

The closest approaches to the present invention with which I am familiar are the patents to Johnson No. 1,912,374 and Aykanian et al. No. 3,160,688, but it is important to recognize that even when the features of these two patents are combined, they fail to disclose the required separation of variables without which satisfactory results cannot be obtained.

Although the Aykanian patent discloses the extrusion of a foam thermoplastic, it has no metering provision and raising or lowering the stock temperature in the cooling zone C would materially affect output rates, as well as mixing efficiency in zone B. Because these steps are not truly independent, an effort to alter one of the variables in the Aykanian system inherently affects the others. For instance, let us assume that the stock in cooling zone C is at too high a temperature, resulting in cell collapse of the extrudate. If the temperature is then lowered by introducing more circulation or a lower temperature coolant in the jacket of zone C, output rates begin to decrease. Therefore, not only does one lose output efficiency, but also the stock in zone B is subjected to different shear rate conditions. Then, if the operator proceeds to raise the r.p.m. of the screw, this causes higher shear rates in zone B and, consequently, higher stock temperature. When the desired output rate is regained, the operator then finds that his stock temperature is again too high and further reduces the temperature in the jacket of zone C. Obviously, this very soon becomes an insurmountable task, or a compromise must be made in either quality or output rates.

While the Johnson patent broadly discloses a single screw extruder and certain elements of apparatus covered by the present invention, such as a gear pump, it will be noted that the required separation of the variables is not disclosed nor suggested. In Johnson, which does not contemplate foam extrusion but rather a system of extruding a rubber jacket on a wire, the gear pump is not provided with an infinitely variable speed control while the process is in operation. Therefore, an operator of this apparatus must shut down the machine, change gears, and start up again, in which event the stock in the pump freezes. The operator is then faced with the need of reheating the entire system in order to start again from scratch. Furthermore, the Johnson patent would not provide all of the necessary elements combined in the present invention for the independent control of the variables in each, which is a critical feature of my invention.

I claim:

1. A continuous process for extruding cellular thermoplastics, comprising the steps of heating, fluxing and mixing a charge of foamable thermoplastic material in an extrusion zone at a temperature defining the melting point of the thermoplastic material, injecting a blowing agent into said material and mixing the same with said material in said extrusion zone, conveying said material through said extrusion zone to a metering zone spaced from said extrusion zone, metering said material at said metering zone, conveying the metered material from said metering zone to a die zone spaced from said metering zone, cooling the material at a cooling zone between the entrance to said metering zone and the entrance to said die zone, passing the metered and cooled material through an extrusion die at said die zone, and independently and relatively adjusting the conveying rate through said extrusion zone and the metering rate through said metering zone during said continuous process, the conveying of said thermoplastic material through said extrusion zone being effected by operating a single screw conveyor at said extrusion zone, the metering being effected by operating a positive displacement gear pump at said metering zone, and the rate of operation of said screw conveyor and the rate of operation of said metering pump being adjusted separately and independently during said process.

2. A continuous process in accordance with Claim 1, further comprising varying the degree of cooling of the material at said cooling zone independently of the temperature of the material at said extrusion zone and said die zone.

3. A continuous process in accordance with Claim 1, wherein said charge of thermoplastic material consists of polymers of ethylenically unsaturated monomers.

4. A continuous process in accordance with Claim 1, wherein said cooling is effected at the metering zone.

5. A continuous process in accordance with Claim 1, wherein said cooling is effected between the metering zone and said die zone.

6. A continuous process in accordance with Claim 1, wherein the heating, fluxing, and mixing occur in substantially the first third of said extrusion zone, said blowing agent is introduced into said material in substantially the second third of said extrusion zone, and the mixing of said blowing agent with said material occurs in the final third of said extrusion zone.

7. A continuous process as set forth in Claim 1, wherein the metered material is conveyed from said metering zone to said die zone passively and without any additional pressure being applied to the metered material beyond the metering zone.

8. A continuous process for extruding cellular thermoplastics, comprising the steps of heating, fluxing and mixing a charge of foamable thermoplastic material in an extrusion zone at a temperature defining the melting point of the thermoplastic material, injecting a blowing agent into said material and mixing the same with said material in said extrusion zone, conveying said material through said extrusion zone to a metering zone spaced from said extrusion zone, metering said material at said metering zone, conveying the metered material from said metering zone to a die zone spaced from said metering zone, cooling the material at a cooling zone between the entrance to said metering zone and the entrance to said die zone, passing the metered and cooled material through an extrusion die at said die zone, and independently and relatively adjusting the conveying rate through said extrusion zone and the metering rate through said metering zone during said continuous process, the metered material being conveyed through said cooling zone passively and without any additional pressure being applied to the metered material beyond the metering zone.

References Cited
UNITED STATES PATENTS

| | | | |
|---|---|---|---|
| 1,912,374 | 6/1933 | Johnson | 18—12 G |
| 3,078,513 | 2/1963 | Levison et al. | 18—12 G |
| 3,151,192 | 9/1964 | Jacobs et al. | 264—53 |
| 3,275,731 | 9/1966 | Kosinsky | 18—12 G |

ROBERT F. WHITE, Primary Examiner

J. B. LOWE, Assistant Examiner

U.S. Cl. X.R.

264—53, DIG. 5, DIG. 13